(12) United States Patent
Steiner et al.

(10) Patent No.: US 10,580,282 B2
(45) Date of Patent: Mar. 3, 2020

(54) EAR BASED CONTEXTUAL ENVIRONMENT AND BIOMETRIC PATTERN RECOGNITION SYSTEM AND METHOD

(71) Applicant: BRAGI GmbH, München (DE)

(72) Inventors: Torsten Steiner, München (DE); Peter Vincent Boesen, München (DE)

(73) Assignee: BRAGI GmbH, Munich (DE)

( * ) Notice: Subject to any disclaimer, the term of this patent is extended or adjusted under 35 U.S.C. 154(b) by 0 days.

(21) Appl. No.: 15/702,323

(22) Filed: Sep. 12, 2017

(65) Prior Publication Data

US 2018/0075724 A1  Mar. 15, 2018

Related U.S. Application Data

(60) Provisional application No. 62/393,356, filed on Sep. 12, 2016.

(51) Int. Cl.
*G08B 21/04* (2006.01)
*G08B 21/12* (2006.01)
(Continued)

(52) U.S. Cl.
CPC ......... *G08B 21/0453* (2013.01); *G06K 9/62* (2013.01); *G08B 21/12* (2013.01); *H04R 1/1016* (2013.01)

(58) Field of Classification Search
CPC ...... G08B 21/0453; G08B 21/12; G06K 9/62; H04R 1/1016; A61B 5/02055; A61F 11/08
See application file for complete search history.

(56) References Cited

U.S. PATENT DOCUMENTS 2,325,590 A   8/1943 Carlisle et al.
2,430,229 A   11/1947 Kelsey
(Continued)

FOREIGN PATENT DOCUMENTS

CN   204244472 U   4/2015
CN   104683519 A   6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Adnan Aziz
(74) *Attorney, Agent, or Firm* — Goodhue, Coleman & Owens, P.C.

(57) ABSTRACT

A method includes providing ear-based contextual environment and biometric pattern recognition using an earpiece including an earpiece housing, an intelligent control disposed within the earpiece housing, a speaker operatively connected to the intelligent control, a microphone operatively connected to the processor. The method includes sensing at least one physiological parameter of a user of the earpiece with at least one biometric sensor operatively connected to the intelligent control, sensing at least one environmental parameter with at least one environmental sensor operatively connected to the intelligent control, performing pattern recognition analysis at the intelligent control of the earpiece using the at least one environmental parameter and the at least one physiological parameter as input to identify an alert condition, and generating an audible alert to the user using the speaker when the pattern recognition analysis indicates presence of the alert condition.

16 Claims, 2 Drawing Sheets

(51) Int. Cl.
*G06K 9/62* (2006.01)
*H04R 1/10* (2006.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,787,857 B2 * | 8/2010 | Peterman .............. G01C 21/30 455/404.1 |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,579,060 B1 * | 2/2017 | Lisy .............. A61B 5/6803 |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |

(56) References Cited

U.S. PATENT DOCUMENTS

| | | | |
|---|---|---|---|
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0017842 A1 | 1/2005 | Dematteo | |
| 2005/0043056 A1 | 2/2005 | Boesen | |
| 2005/0094839 A1 | 5/2005 | Gwee | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0064037 A1* | 3/2006 | Shalon | A61B 5/0006 |
| | | | 600/586 |
| 2006/0073787 A1 | 4/2006 | Lair et al. | |
| 2006/0074671 A1 | 4/2006 | Farmaner et al. | |
| 2006/0074808 A1 | 4/2006 | Boesen | |
| 2006/0166715 A1 | 7/2006 | Engelen et al. | |
| 2006/0166716 A1 | 7/2006 | Seshadri et al. | |
| 2006/0220915 A1 | 10/2006 | Bauer | |
| 2006/0258412 A1 | 11/2006 | Liu | |
| 2007/0230736 A1* | 10/2007 | Boesen | H04M 1/05 |
| | | | 381/380 |
| 2008/0027679 A1* | 1/2008 | Shklarski | A61B 5/681 |
| | | | 702/182 |
| 2008/0076972 A1 | 3/2008 | Dorogusker et al. | |
| 2008/0090622 A1 | 4/2008 | Kim et al. | |
| 2008/0146890 A1 | 6/2008 | LeBoeuf et al. | |
| 2008/0154098 A1* | 6/2008 | Morris | A61B 5/02416 |
| | | | 600/300 |
| 2008/0254780 A1 | 10/2008 | Kuhl et al. | |
| 2008/0255430 A1 | 10/2008 | Alexandersson et al. | |
| 2009/0003620 A1 | 1/2009 | McKillop et al. | |
| 2009/0008275 A1 | 1/2009 | Ferrari et al. | |
| 2009/0017881 A1 | 1/2009 | Madrigal | |
| 2009/0073070 A1 | 3/2009 | Rofougaran | |
| 2009/0097689 A1 | 4/2009 | Prest et al. | |
| 2009/0105548 A1 | 4/2009 | Bart | |
| 2009/0191920 A1 | 7/2009 | Regen et al. | |
| 2009/0245559 A1 | 10/2009 | Boltyenkov et al. | |
| 2009/0261114 A1 | 10/2009 | McGuire et al. | |
| 2009/0296968 A1 | 12/2009 | Wu et al. | |
| 2010/0033313 A1 | 2/2010 | Keady et al. | |
| 2010/0203831 A1 | 8/2010 | Muth | |
| 2010/0210212 A1 | 8/2010 | Sato | |
| 2010/0217102 A1* | 8/2010 | LeBoeuf | A61B 5/00 |
| | | | 600/310 |
| 2010/0318482 A1* | 12/2010 | Bartlett | G06K 9/6215 |
| | | | 706/12 |
| 2010/0320961 A1 | 12/2010 | Castillo et al. | |
| 2011/0140844 A1 | 6/2011 | McGuire et al. | |
| 2011/0239497 A1 | 10/2011 | McGuire et al. | |
| 2011/0286615 A1 | 11/2011 | Olodort et al. | |
| 2012/0057740 A1 | 3/2012 | Rosal | |
| 2013/0316642 A1 | 11/2013 | Newham | |
| 2013/0346168 A1 | 12/2013 | Zhou et al. | |
| 2014/0079257 A1 | 3/2014 | Ruwe et al. | |
| 2014/0106677 A1 | 4/2014 | Altman | |
| 2014/0122116 A1 | 5/2014 | Smythe | |
| 2014/0153768 A1 | 6/2014 | Hagen et al. | |
| 2014/0163771 A1 | 6/2014 | Demeniuk | |
| 2014/0185828 A1 | 7/2014 | Helbling | |
| 2014/0219467 A1 | 8/2014 | Kurtz | |
| 2014/0222462 A1 | 8/2014 | Shakil et al. | |
| 2014/0235169 A1 | 8/2014 | Parkinson et al. | |
| 2014/0270227 A1 | 9/2014 | Swanson | |
| 2014/0270271 A1 | 9/2014 | Dehe et al. | |
| 2014/0335908 A1 | 11/2014 | Krisch et al. | |
| 2014/0348367 A1 | 11/2014 | Vavrus et al. | |
| 2015/0028996 A1 | 1/2015 | Agrafioti et al. | |
| 2015/0110587 A1 | 4/2015 | Hori | |
| 2015/0148989 A1 | 5/2015 | Cooper et al. | |
| 2015/0170504 A1* | 6/2015 | Jooste | A61B 5/6898 |
| | | | 340/539.12 |
| 2015/0208933 A1* | 7/2015 | Satomi | A61B 5/02416 |
| | | | 600/479 |
| 2015/0238819 A1* | 8/2015 | Volkerink | H04W 4/70 |
| | | | 482/4 |
| 2015/0242605 A1* | 8/2015 | Du | G06F 21/32 |
| | | | 726/7 |
| 2015/0245127 A1 | 8/2015 | Shaffer | |
| 2015/0332564 A1* | 11/2015 | Weinberg | G08B 6/00 |
| | | | 340/407.1 |
| 2015/0366471 A1* | 12/2015 | LeBoeuf | A61B 5/0059 |
| | | | 600/301 |
| 2016/0033280 A1 | 2/2016 | Moore et al. | |
| 2016/0072558 A1 | 3/2016 | Hirsch et al. | |
| 2016/0073189 A1 | 3/2016 | Lindén et al. | |
| 2016/0125892 A1 | 5/2016 | Bowen et al. | |
| 2016/0135046 A1* | 5/2016 | Archibald | H04W 12/06 |
| | | | 455/411 |
| 2016/0187153 A1* | 6/2016 | Johnson | G16H 40/63 |
| | | | 701/500 |
| 2016/0324478 A1* | 11/2016 | Goldstein | A61B 5/721 |
| 2016/0360350 A1 | 12/2016 | Watson et al. | |
| 2017/0059152 A1 | 3/2017 | Hirsch et al. | |
| 2017/0060262 A1 | 3/2017 | Hviid et al. | |
| 2017/0060269 A1 | 3/2017 | Förstner et al. | |
| 2017/0061751 A1 | 3/2017 | Loermann et al. | |
| 2017/0062913 A1 | 3/2017 | Hirsch et al. | |
| 2017/0064426 A1 | 3/2017 | Hviid | |
| 2017/0064428 A1 | 3/2017 | Hirsch | |
| 2017/0064432 A1 | 3/2017 | Hviid et al. | |
| 2017/0064437 A1 | 3/2017 | Hviid et al. | |
| 2017/0078780 A1 | 3/2017 | Qian et al. | |
| 2017/0108918 A1 | 4/2017 | Boesen | |
| 2017/0109131 A1 | 4/2017 | Boesen | |
| 2017/0110124 A1 | 4/2017 | Boesen et al. | |
| 2017/0110899 A1 | 4/2017 | Boesen | |
| 2017/0111723 A1 | 4/2017 | Boesen | |
| 2017/0111725 A1 | 4/2017 | Boesen et al. | |
| 2017/0111726 A1 | 4/2017 | Martin et al. | |
| 2017/0111740 A1 | 4/2017 | Hviid et al. | |
| 2017/0112671 A1* | 4/2017 | Goldstein | A61F 11/08 |
| 2017/0151447 A1 | 6/2017 | Boesen | |
| 2017/0151668 A1 | 6/2017 | Boesen | |
| 2017/0151918 A1 | 6/2017 | Boesen | |
| 2017/0151930 A1 | 6/2017 | Boesen | |
| 2017/0151957 A1 | 6/2017 | Boesen | |
| 2017/0151959 A1 | 6/2017 | Boesen | |
| 2017/0153114 A1 | 6/2017 | Boesen | |
| 2017/0153636 A1 | 6/2017 | Boesen | |
| 2017/0154532 A1 | 6/2017 | Boesen | |
| 2017/0155985 A1 | 6/2017 | Boesen | |
| 2017/0155992 A1 | 6/2017 | Perianu et al. | |
| 2017/0155993 A1 | 6/2017 | Boesen | |
| 2017/0155997 A1 | 6/2017 | Boesen | |
| 2017/0155998 A1 | 6/2017 | Boesen | |
| 2017/0156000 A1 | 6/2017 | Boesen | |
| 2017/0178631 A1 | 6/2017 | Boesen | |
| 2017/0180842 A1 | 6/2017 | Boesen | |
| 2017/0180843 A1 | 6/2017 | Perianu et al. | |
| 2017/0180897 A1 | 6/2017 | Perianu | |
| 2017/0188127 A1 | 6/2017 | Perianu et al. | |
| 2017/0188132 A1 | 6/2017 | Hirsch et al. | |
| 2017/0195829 A1 | 7/2017 | Belverato et al. | |
| 2017/0208393 A1 | 7/2017 | Boesen | |
| 2017/0214987 A1 | 7/2017 | Boesen | |
| 2017/0215016 A1 | 7/2017 | Dohmen et al. | |
| 2017/0216672 A1* | 8/2017 | Wisbey | G09B 19/003 |
| 2017/0230752 A1 | 8/2017 | Dohmen et al. | |
| 2017/0257698 A1 | 9/2017 | Boesen et al. | |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |

(56) References Cited

FOREIGN PATENT DOCUMENTS

| | | |
|---|---|---|
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is On Facebook (2014).
BRAGI Update—Arrival Of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready To Rumble, A Lot To Be Done Over Christmas (Dec. 22, 2014).
BRAGI Update—Memories From April—Update On Progress (Sep. 16, 2014).
BRAGI Update—Memories from May—Update On Progress—Sweet (Oct. 13, 2014).
BRAGI Update—Memories From One Month Before Kickstarter—Update On Progress (Jul. 10, 2014).
BRAGI Update—Memories From The First Month of Kickstarter—Update on Progress (Aug. 1, 2014).
BRAGI Update—Memories From The Second Month of Kickstarter—Update On Progress (Aug. 22, 2014).
BRAGI Update—New People ©BRAGI—Prototypes (Jun. 26, 2014).
BRAGI Update—Office Tour, Tour To China, Tour to CES (Dec. 11, 2014).
BRAGI Update—Status On Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back To China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status On Wireless, Supply, Timeline and Open House@BRAGI(Apr. 1, 2015).
BRAGI Update—Unpacking Video, Reviews On Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness In Mobility", Fountain Valley, Californa (2017).
International Search Report & Written Opinion, PCT/EP2016/070231 (dated Nov. 18, 2016).
Last Push Before The Kickstarter Campaign Ends on Monday 4pm CET (Mar. 28, 2014).
Nigel Whitfield: "Fake tape detectors, 'from the stands' footle and UGH? Internet of Things in my set-top box"; http://www.theregister.co.uk/2014/09/24/ibc_round_up_object_audio_dlna.iot/ (Sep. 24, 2014)
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

EAR BASED CONTEXTUAL ENVIRONMENT AND BIOMETRIC PATTERN RECOGNITION SYSTEM AND METHOD

PRIORITY STATEMENT

This application claims priority to U.S. Provisional Patent Application 62/393,356, filed on Sep. 12, 2016, and entitled "Ear Based Contextual Environment And Biometric Pattern Recognition System And Method", hereby incorporated by reference in its entirety.

FIELD OF THE INVENTION

The present invention relates to wearable devices. More particularly, but not exclusively, the present invention relates to earpieces.

BACKGROUND

Many computer programs depend upon active interaction between the user and the computer program for proper functioning. As human-computer interfaces have matured, the user responses and programming required have changed. Human-computer interaction now utilizes multiple user input modalities as well as computer self-learning in order to adapt to a user's current state. In the biomedical field, as user input and monitoring have become more sophisticated, programming has responded in kind. For example, passive monitoring may be used to monitor user activity regardless of user interaction using contextual biometric patterns. What is currently needed is a system capable of discerning multiple user states in response to multiple inputs. Such a system would be capable of detecting a variety of user states within the user's environment or in relation to user's environment and react based upon the user and/or the user's physiology.

SUMMARY

Therefore, it is a primary object, feature, or advantage to improve over the state of the art.

It is a further object, feature, or advantage to provide the ability to monitor both the user and the environment via an earpiece worn on one or both sides.

It is a still further object, feature, or advantage to provide the ability of the device to monitor ongoing physiologic parameters against user based norms.

It is another object, feature, or advantage to provide the ability of the device to concurrently monitor environmental parameters in conjunction with the physiologic parameters of the user based norms.

Yet another object, feature, or advantage is to provide the ability to proactively link environmental to physiologic parameters of the user and suggest actionable options to the user.

A further object, feature, or advantage is to provide the ability of the device to escalate the level of intervention in light of worsening environmental conditions, or worsening physiologic conditions.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an object, feature, or advantage stated herein.

According to one aspect, a method includes providing ear-based contextual environment and biometric pattern recognition using an earpiece including an earpiece housing, an intelligent control disposed within the earpiece housing, a speaker operatively connected to the intelligent control, a microphone operatively connected to the processor. The method includes sensing at least one physiological parameter of a user of the earpiece with at least one biometric sensor operatively connected to the intelligent control, sensing at least one environmental parameter with at least one environmental sensor operatively connected to the intelligent control, performing pattern recognition analysis at the intelligent control of the earpiece using the at least one environmental parameter and the at least one physiological parameter as input to identify an alert condition, and generating an audible alert to the user using the speaker when the pattern recognition analysis indicates presence of the alert condition. The pattern recognition analysis may be performed using user norm data stored on a data storage device disposed within the earpiece housing and operatively connected to the processor. The pattern recognition analysis may be performed using previously sensed environmental parameters and previously sensed physiological parameters. The at least one environmental sensor may include a carbon monoxide sensor, an ambient temperature sensor, a radiation sensor, and other types of environmental sensors. The method may further include wirelessly communicating a message over a network to a remote device indicative of the alert condition. The method may further include associating location data with the at least one environmental parameter. The method may further include receiving the location data over a wireless connection with a mobile device.

According to another aspect, a method includes providing ear-based contextual environment and biometric pattern recognition using an earpiece including an earpiece housing, an intelligent control disposed within the earpiece housing, a speaker operatively connected to the intelligent control, a microphone operatively connected to the processor, a plurality of biometric sensors operatively connected to the intelligent control, and a plurality of environmental sensors operatively connected to the intelligent control. The method includes steps of monitoring a plurality of physiological parameters of a user of the earpiece the plurality of biometric sensors operatively connected to the intelligent control, monitoring a plurality of environmental parameters with the plurality of environmental sensors operatively connected to the intelligent control, and performing pattern recognition analysis at the intelligent control of the earpiece using the plurality of environmental parameters and the plurality of physiological parameters as input on an ongoing basis to identify alert conditions. The method further includes generating an audible alert to the user using the speaker when the pattern recognition analysis indicates presence of one or more alert conditions. The method may further include associating location data with the plurality of environmental parameters. The location data may be received over a wireless connection with a mobile device.

DETAILED DESCRIPTION

Figure 1:
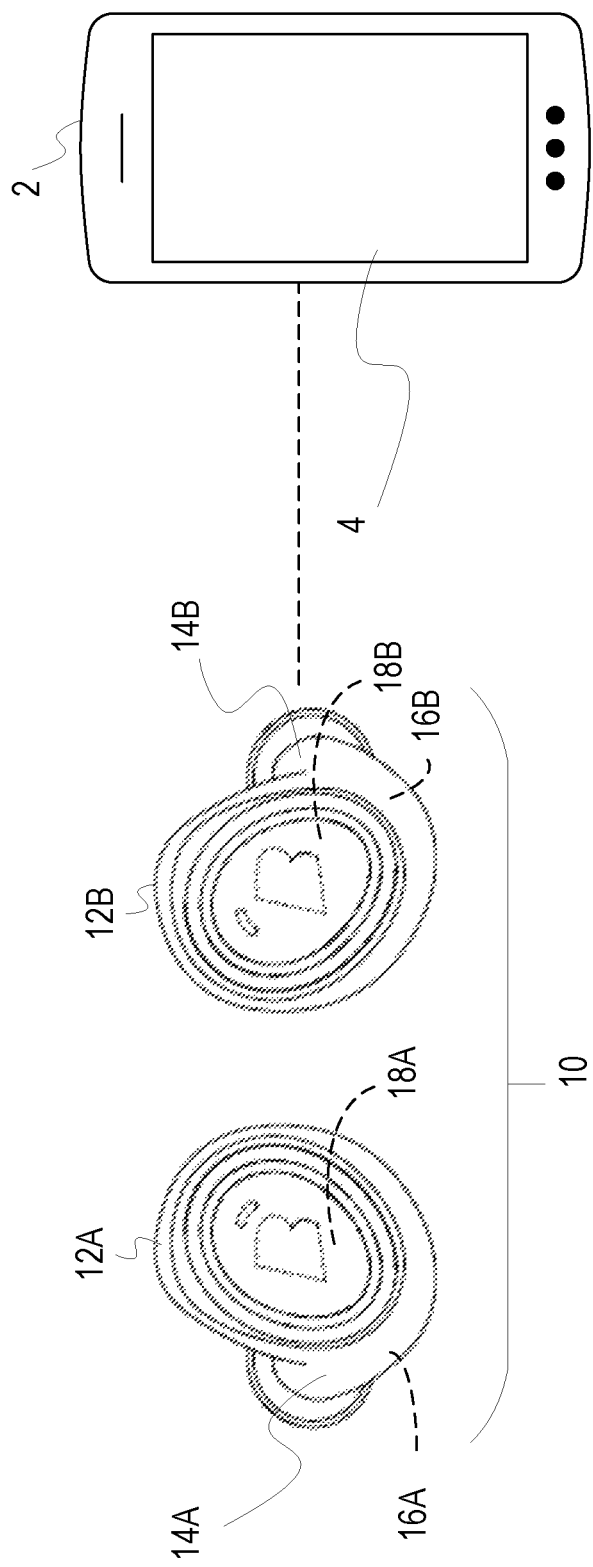
FIG. 1 illustrates a left and right earpiece and a mobile device.

The present invention allows for ear-based contextual environment and/or biometric pattern recognition. FIG. 1 illustrates a set of wireless earpieces 10 which includes a first earpiece 12A and a second earpiece 12B. Each of the earpieces 12A, 12B has a respective earpiece housing 14A, 14B. There is at least one biometric sensor 16A, 16B associated with each earpiece housing 14A, 14B. There is at least one environmental sensor 18A, 18B associated with each earpiece housing 14A, 14B. Each biometric sensor 16A, 16B may be used to sense physiological data associated with a user. The physiological data may include, without limitation, body temperature data, pulse rate, pulse oximetry, movement, or other types of physiological data which may be detected optically, aurally, electrically, or otherwise. The environmental data is data which is not detected at the body of the user but instead is part of the surroundings of the user. This may include ambient temperature, atmospheric pressure, gas concentrations (including carbon monoxide), ambient sound, ambient light and UV exposure, humidity, background radiation, or other types of environmental conditions.

Although two earpieces are shown in FIG. 1, only one is needed. Where both a left and a right earpiece are worn by a user, data may be collected at each earpiece and analyzed there, or alternatively, data from both earpieces may be analyzed at one of the earpieces.

A mobile device 2 with a screen 4 is also shown. The mobile device 2 may be in wireless communication with one or both of the earpieces 12A, 12B such as through BLUETOOTH, BLE, Wi-Fi, or other types of wireless communications. Information may be conveyed to the mobile device 2 for storage, further analysis, or to send messages over a communications network accessible by the mobile device 2 such as a cellular communications network such as a 3G, 4G, LTE, or other type of cellular communications network or other type of communications network. In addition, where the mobile device 2 is capable of determining location information such as through use of an onboard GPS receiver, or based on the location of cellular network towers, the location information may be associated with the sensor data by the mobile device 2. Alternatively, location and/or time information may be communicated from the mobile device 2 to the one or more earpieces 12A, 12B and the wireless earpiece(s) may associate sensed data with a location and take location into account as a part of the analysis performed.

Data received from the one or more environmental sensors and one more biometric sensors may be received at an intelligent control system which may include one or more processors, digital processors, or other logic engines for analyzing the data. The received data may then be pre-processed in any number of different ways including to remove noise, to extract features, or to normalize the data. The data may then be transformed and pattern recognition may be performed. It is to be understood that the transformation process may be used to map data from a high-dimension space to a lower dimensional sub-space so as to reduce dimensionality of the data. The pattern recognition may include classification steps or clustering. Various types of pattern recognition algorithms may be applied. This may include symbolic time series analysis, wavelet analysis, neural network analysis, and/or any number of statistical analysis techniques including those disclosed in *Pattern Recognition and Machine Learning* (*Information Science and Statistics*), Christopher M. Bishop, Springer (2011); *Pattern Recognition*, Fourth Edition, Sergios Theodoridis and Konstantinos Koutroumbas, Academic Press (2008), both of which are hereby incorporated by reference.

Figure 2:
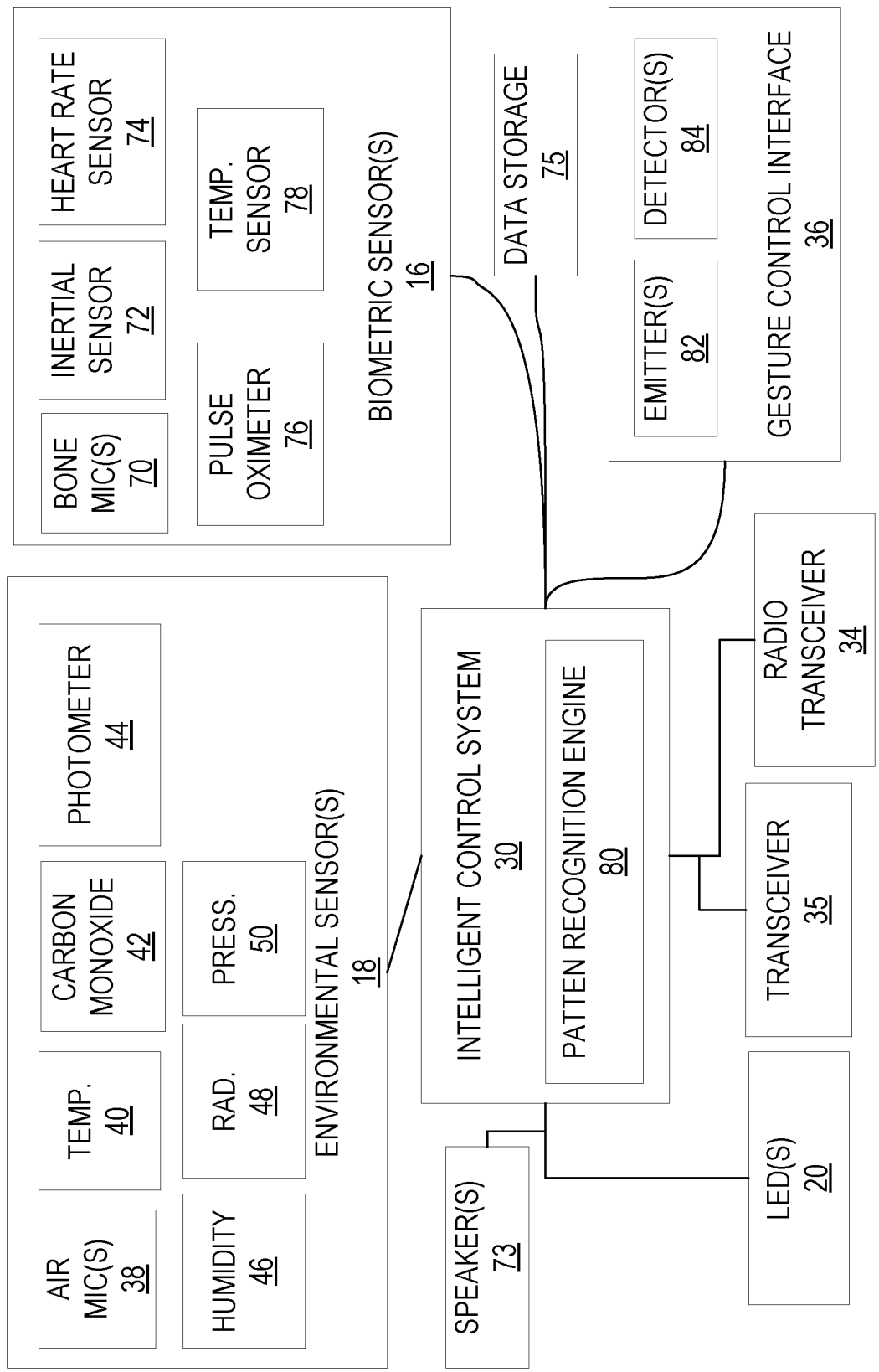
FIG. 2 is a block diagram of one example of an earpiece.

FIG. 2 illustrates a block diagram of one example of a wireless earpiece. The wireless earpiece includes one or more biometric sensors 16 and one or more environmental sensors 18. Examples of environmental sensors may include one or more air microphones 38. Where more than one air microphone 38 is used, each may be placed facing a different direction in order to better sense ambient or environmental audio regardless of direction. The one or more environmental sensors 18 may include a temperature sensor 40 for sensing ambient temperature. The one or more environmental sensors 18 may further include one or more gas sensors such as a carbon monoxide sensor 42. Other types of gas sensors may be used including to monitor air pollution or poisonous or toxic gases including gas sensors relying upon microfluidics or nanofluidics. Other chemical or biochemical sensors may be used such as to detect anthrax spores or other toxic materials. A photometer 44 is also shown which may be used to measure ambient light and/or UV exposure. A humidity sensor 46 is also shown which may be used to measure humidity. A radiation sensor such as a Geiger radiation sensor 48 is also shown which may be used to measure background radioactivity. An atmospheric pressure sensor 50 may also be used to measure atmospheric pressure. The environmental sensors 18 may also include any number of other type of environmental sensors including chemical sensors, gas sensors, or other types of sensors for sensing environmental parameters.

Examples of biometric sensors 16 may include one or more bone conduction microphones 70, inertial sensors 72, hear rate sensors 74, pulse oximeters 76, body temperature sensors 78, or other type of biometric sensors 16 which may be used to sense physiological parameters.

Each of the environmental sensors 18 and each of the biometric sensors 16 are operatively connected to an intelligent control system 30. The intelligent control system 30 may include hardware components such as one or more processors, digital signal processors, mixed signal processors, or other types of components and a pattern recognition engine 80. The pattern recognition engine may perform pattern recognition analysis on the environmental parameters from the environmental sensors 18 and the physiological parameters from the biometric sensors 16. In particular, the pattern recognition engine may identify patterns that relate environmental parameters and biometric parameters. Thus, the wireless earpiece may proactively link environmental to physiological parameters of the user and suggest actionable options to the user.

As an example, the wireless earpiece may monitor carbon monoxide levels. This may be performed in a proactive manner. The monitoring may be continuously or may be periodic. The monitoring may also be based on a location of the user, or based on an activity of a user. Thus, for example, if there is a concern about carbon monoxide levels at a particular location (e.g. a user's home), then carbon monoxide monitoring may periodically occur. If the carbon monoxide levels are above a particular level, then the interval between measurements may be decreased so measurements are taken more frequently or the monitoring may provide for continuous measurements. In addition to this environmental data, physiological data from one or more biometric sensors may be taken. For example, data from the pulse oximeter may be used to indirectly determine oxygen saturation within a user. The pattern recognition analysis may relate the environmental data to the physiological data in order to warn the user of the dangers and to appropriately increase the severity of the warnings consistent with changes in the analysis. It is further to be understood that in addition to the pulse oximeter data other types of physiological data may be relevant in this example. For example, one of the symptoms of carbon monoxide poisoning is dizziness which may alter movement of a user as detected by an inertial sensor 72, thus various physiological parameters may be used in the analysis.

As another example, if the user is engaged in outside physical activity such as bicycling or running as can be determined using the inertial sensor 72, the humidity sensor 46, ambient temperature sensor 40, and photometer 44 may be used in order to sense environmental parameters. The biometric sensors may be used to sense physiological parameters including the heart rate sensor 74, pulse oximeter 76, and/or temperature sensor 78. The health or well-being of the user as determined by the physiological parameters has some relationship with the environmental parameters. In other words, if it is an extremely humid day as determined by the humidity sensor 46 and it is also an extremely hot day as determined by the ambient temperature sensor 40, then as the user continues to exercise, the environmental conditions will have an effect which may be felt more immediately than under less extreme environmental conditions. The pattern recognition analysis may again relate the environmental parameters to the physiological parameters in order to suggest actionable options to the user. This may include an alert indicating that a user should stop exercising, reduce their intensity, take a break in order to replenish fluid, go inside, or take other appropriate actions.

One or more speakers 73 are also operatively connected to the intelligent control system 30. The speakers 73 may be used to transduce audio for various purposes including to provide an audible alert or warning to a user when an alert condition has been detected. One or more LEDs 20 may also be operatively connected to the intelligent control system 30. The LEDs 20 may be used for various purposes including to indicate that an alert condition has been detected in order to convey the alert condition to others in the presence of a user wearing the earpiece. One or more transceivers may be present such as a near field magnetic induction transceiver 35 and a radio transceiver 34. In some embodiments, the NFMI transceiver 35 may be used to communicate with another earpiece. The radio transceiver 34 may be used to provide Bluetooth, BLE, Wi-Fi, or other types of radio communications such as between earpieces or between one or more earpieces and remote devices such as mobile phones. A gestural control interface 36 is also operatively connected to the intelligent control system 30. The gestural control interface provides for receiving user input in a non-voice modality. Thus, for example gestures such as touching, holding, swiping, or other gestures may serve as user input into the wireless earpiece. In addition, user input may be given in other ways including through voice commands received by the one or more bone microphones, input through movements detected with the inertial sensor 72, or otherwise. A data storage device 75 disposed within the housing is also operatively connected to the intelligent control system or may be a part of the intelligent control system. The data storage device 75 may be used to store data regarding environmental parameters and physiological parameters. Thus, historical information may be stored for different environments and for the user. In addition, user norms either for the specific user or a population of users may be stored which may be used as input in the pattern recognition analysis. Results of the pattern recognition analysis may also be stored.

Where the pattern recognition engine is used to identify one or more alert conditions, this information may be conveyed to a user. For example, an audio message may be played using the speakers 73 providing a recommendation for a user. The recommendation may be to leave an area, to rest, to decrease physical activity, to drink water, to call for help, or other appropriate recommendations based on the analysis. The audio message may also specifically indicate the environmental or physiological data used in the analysis or characterize it in a quantitative or qualitative manner. Where significant issues are identified and immediate health risks perceived, other appropriate actions may be taken, such as communicating to a mobile device to place a call or send a text message or other type of message to an emergency responder, an emergency contact, or other appropriate personnel.

According to one method, ear-based contextual environment and biometric pattern recognition is performed using an earpiece. As previously described, the earpiece may include an earpiece housing, an intelligent control 30 disposed within the earpiece housing, a speaker 73 operative connected to the intelligent control 30, and a microphone 38, 70 operatively connected to the intelligent control 30 as well as at least one environmental sensor 18 operatively connected to the intelligent control 30 and at least one biometric sensor 16 operatively connected to the intelligent control 30. The method may include sensing at least one physiological parameter of a user of the earpiece with at least one biometric sensor 16 and sensing at least one environmental parameter with the at least one environmental sensor 18. Next a pattern recognition analysis is performed at the intelligent control 30 of the earpiece using the at least one environmental parameter and the at least on physiological parameter as input. An additional input may be location information associated with the at least one environmental parameter. The location information may be location information which is received over a wireless connection to a mobile device. For example, a device with a GPS receiver or which otherwise provides for location determination such as a mobile phone may communicate location information to the earpiece over a wireless connection and the location information may be used as a part of the analysis.

The pattern recognition analysis may be used to identify an alert condition. The alert condition may then be conveyed to the user such as by transducing an audio message at one or more speakers 73 of the earpiece. In addition, depending upon the alert condition, the alert condition may be communicated to other devices such as a mobile device in operatively communication with the earpiece and may be further communicated over a communications network to others.

The severity of an alert condition may escalate. Thus, for example, as an environmental condition worsens and/or the effects of the environmental condition of an individual worsen as determined based on the pattern recognition analysis, the alert condition may escalate. Escalation may be reflected in the audio message conveyed to a user in terms of making stronger recommendations or changing recommendations. For example, instead of recommending that a user slow down, the recommendation may escalate to a recommendation that the user stop their physical activity. Similarly, communication of a message to emergency personnel, emergency contacts or others may be another form of escalation.

Therefore, various methods, systems, and earpieces have been shown and described herein. The present invention contemplates numerous variations, options, and alternatives. This may include variations in the type and number of environmental sensors where present, variations in the number and type of biometric sensors where present, variations in the algorithms used for processing data from the environmental and/or biometric sensors, and other variations, options, and alternatives.

What is claimed is:

1. A method of providing ear-based contextual environment and biometric pattern recognition using an earpiece including an earpiece housing, an intelligent control disposed within the earpiece housing, a speaker operatively connected to the intelligent control, a microphone operatively connected to the intelligent control, the method comprising:

sensing at least one physiological parameter of a user of the earpiece with at least one biometric sensor operatively connected to the intelligent control;

sensing at least one environmental parameter of a plurality of environmental parameters, with at least one environmental sensor of a plurality of environmental sensors operatively connected to the intelligent control, wherein the at least one environmental parameter is sensed based on a location of the user;

monitoring the at least one environmental parameter of the plurality of environmental parameters with the at least one environmental sensor, wherein a measurement interval associated with the monitoring of the at least one environmental parameter of the plurality of environmental parameters is decreased in response to the at least one environmental parameter of the plurality of environmental parameters exceeding a specific level;

performing pattern recognition analysis at the intelligent control of the earpiece using the at least one environmental parameter and the at least one physiological parameter as input to identify an alert condition; and generating an audible alert to the user using the speaker when the pattern recognition analysis indicates presence of the alert condition, wherein the audible alert identifies actionable options to the user.

2. The method of claim 1 wherein the pattern recognition analysis is performed further using user norm data stored on a data storage device disposed within the earpiece housing and operatively connected to the intelligent control.

3. The method of claim 1 wherein the performing the pattern recognition analysis is further performed using previously sensed environmental parameters and previously sensed physiological parameters.

4. The method of claim 1 wherein the at least one environmental sensor comprises a carbon monoxide sensor.

5. The method of claim 1 wherein the at least one environmental sensor comprises an ambient temperature sensor.

6. The method of claim 1 wherein the at least one environmental sensor comprises a radiation sensor.

7. The method of claim 1 wherein the at least one environmental sensor comprises a carbon monoxide sensor and the at least one biometric sensor comprises a pulse oximeter.

8. The method of claim 7 wherein the at least one biometric sensor further comprises at least one inertial sensor.

9. The method of claim 1 further comprising wirelessly communicating a message over a network to a remote device indicative of the alert condition.

10. The method of claim 1 further comprising receiving the location of the user over a wireless connection with a mobile device.

11. The method of claim 1 further comprising mapping the at least one environmental parameter and the at least one physiological parameter from a high-dimension space to a lower-dimension subspace.

12. The method of claim 1 wherein the pattern recognition analysis includes clustering.

13. The method of claim 2 wherein the user norm data is associated with a population of users.

14. The method of claim 1 wherein the audible alert includes a recommendation if the pattern recognition analysis determines a deterioration of the at least one environmental parameter.

15. A method of providing ear-based contextual environment and biometric pattern recognition using an earpiece including an earpiece housing, an intelligent control disposed within the earpiece housing, a speaker operatively connected to the intelligent control, a microphone operatively connected to the intelligent control, a plurality of biometric sensors operatively connected to the intelligent control, and a plurality of environmental sensors operatively connected to the intelligent control, the method comprising:

monitoring a plurality of physiological parameters of a user of the earpiece with the plurality of biometric sensors operatively connected to the intelligent control;

monitoring a plurality of environmental parameters with the plurality of environmental sensors operatively connected to the intelligent control, wherein at least one first environmental parameter of the plurality of environmental parameters is based on a location of the user;

wherein a measurement interval associated with the monitoring of the plurality of the environmental parameters is decreased in response to the at least one first environmental parameter of the plurality of environmental parameters exceeding a specific level;

performing pattern recognition analysis at the intelligent control of the earpiece using the plurality of environmental parameters and the plurality of physiological parameters as input on an ongoing basis to identify alert conditions; and generating an audible alert to the user using the speaker when the pattern recognition analysis indicates presence of one or more alert conditions, wherein the audible alert identifies actionable options to the user.

16. The method of claim 15 further comprising receiving the location of the user over a wireless connection with a mobile device.

* * * * *